US005401298A

United States Patent [19]

Voss

[11] Patent Number: 5,401,298

[45] Date of Patent: Mar. 28, 1995

[54] SORPTION PUMP

[75] Inventor: Gunter Voss, Much, Germany

[73] Assignee: Leybold Inficon, Inc., E. Syracuse, N.Y.

[21] Appl. No.: 123,140

[22] Filed: Sep. 17, 1993

[51] Int. Cl.[6] .......... B01D 53/04

[52] U.S. Cl. .......... 96/134; 96/147; 417/48

[58] Field of Search .......... 95/43, 45; 96/4, 134, 96/147, 152; 417/48-51

[56] References Cited

U.S. PATENT DOCUMENTS

| | | | |
|---|---|---|---|
| 2,060,861 | 11/1936 | Glans | 417/48 |
| 2,511,726 | 6/1950 | Lockwood | 96/147 |
| 3,197,945 | 8/1965 | Zaphiropoulos | 417/48 |
| 3,208,203 | 9/1965 | Markevitch | 96/147 |
| 3,310,227 | 3/1967 | Milleron | 96/4 |
| 3,638,401 | 2/1972 | Kabler | 55/158 |
| 3,791,106 | 2/1974 | Haley | 55/158 |
| 3,868,239 | 2/1975 | Visser | 96/152 |
| 3,926,832 | 12/1975 | Barosi | 252/181.6 |
| 3,942,546 | 3/1976 | Radd et al. | 417/49 X |
| 3,953,755 | 4/1976 | Kuus et al. | 417/48 X |
| 3,961,897 | 6/1976 | Giorgi et al. | 55/208 X |
| 3,992,626 | 11/1976 | Bursack | 250/288 |
| 4,088,456 | 5/1978 | Giorgi et al. | 55/179 |
| 4,127,790 | 11/1978 | Kuus et al. | 417/48 X |
| 4,146,277 | 3/1979 | Santoro | 96/134 |
| 4,193,398 | 3/1980 | Refson | 417/48 X |
| 4,272,259 | 6/1981 | Patterson et al. | 417/48 X |
| 4,481,441 | 11/1984 | van Gils | 417/48 X |
| 4,874,339 | 10/1989 | Bratz | 445/28 |
| 4,907,948 | 3/1990 | Barosi et al. | 417/48 X |
| 5,149,429 | 9/1992 | Baker | 96/134 X |
| 5,191,980 | 3/1993 | Boffito et al. | 417/48 X |

FOREIGN PATENT DOCUMENTS

| | | | |
|---|---|---|---|
| 0352371 | 11/1988 | European Pat. Off. | |
| 3332647 | 3/1985 | Germany | 417/51 |

*Primary Examiner*—Robert Spitzer

*Attorney, Agent, or Firm*—Harris Beach & Wilcox

[57] ABSTRACT

A sorption pump for high vacuum applications that is suited for use in gas analyzers such as mass spectrometers. The pump includes a housing containing a quantity of getter material and a diffusion barrier in the gas inlet to the housing. A finite period of time is required for gas molecules in the vacuum analyzer system to cross the barrier, thus providing a window during which gas pulses can be accurately analyzed.

8 Claims, 2 Drawing Sheets

SORPTION PUMP

BACKGROUND OF THE INVENTION

This invention relates to a sorption pump, and in particular, to a sorption pump that is ideally suited for use in high vacuum gas analyzers.

A sorption or getter pump is described in U.S. Pat. No. 3,961,897 which issued to Giorgi et al. Getter pumps of this type are well known in the art and are used to establish and maintain a vacuum within a vessel. As noted by Giorgi et al. the sorptive material used in the pump may be selected from any number of non-evaporable getter materials that are suitable for pumping various gas molecules from the vessel in order to maintain the vessel at a desired vacuum pressure.

Giorgi et al., in a later U.S. Pat. No. 4,088,456, discloses a pumping system which, in its simplest form, is a cylindrical tube that is connected to a vacuum chamber. The internal surface of the tube is coated with a non-evaporable getter material characterized as having a sorptive capacity for certain gases at vapor pressures less than $10^{-5}$ torr. Suitable non-evaporable getter materials for this purpose are disclosed as Zr, Ti, Ta, Nb, V and mixtures thereof with other metals such as Al.

Sorption pumps containing getter materials absorb gas molecules either physically or through chemical reaction wherein the molecules are either captured on the material surface or dissolved into the material. In any event, the molecules are "pumped" from the vacuum chamber to maintain the chamber at a desired vacuum pressure. In the case of non-evaporating getters, the pump is able to form chemical compounds with most gases and thus can be used for a number of different applications.

Conventional sorption pumps, however, are not suitable for use in conjunction with gas analyzers and, in particular, in mass spectrometers. Common to all sorption pumps is the fact that the pumping speed, that is, the sorption speed of the getter material, is dependent on such variables as the getter material that is employed, the getter material history, the pump temperature, and the gas loading. The pumping speed can, and usually does, change dramatically with time and usage. In gas analysis equipment such as mass spectrometers, it is essential that one be able to accurately measure the partial pressure of a gas or gases involved. The partial pressure of a gas is expressed in terms of gas flow divided by pumping speed. Where the pumping speed is unknown or cannot be accurately determined, as in the case of a conventional getter pump, the gas flow also cannot be accurately evaluated quantitatively and the partial pressure cannot be determined.

SUMMARY OF THE INVENTION

It is therefore an object of the present invention to improve sorption pumps.

A further object of the present invention is to provide a sorption pump that is capable of operating in a gas analyzing system.

A still further object of the present invention is to provide a sorption pump that is suitable for use in a mass spectrometer.

Another object of the present invention is to provide a sorption pump which is capable of operating at a constant pumping speed during periods when a gas sample is being analyzed and which can be reused repeatedly after a short recovery time.

These and other objects of the present invention are attained by means of a sorption pump having an enclosed housing containing a sorptive material and having an entrance through which gas molecules from a vacuum chamber reach the material. A diffusion barrier preferably in the form of a frit, is mounted in the entrance so that a finite period of time is required for the gas molecules to pass through the diffusion barrier.

BRIEF DESCRIPTION OF THE DRAWINGS

For a better understanding of these and other objects of the present invention, reference shall be made to the following detailed description of the invention which are to be read in association with the accompanying drawings, wherein.

DETAILED DESCRIPTION OF A PREFERRED EMBODIMENT

Figure 1:
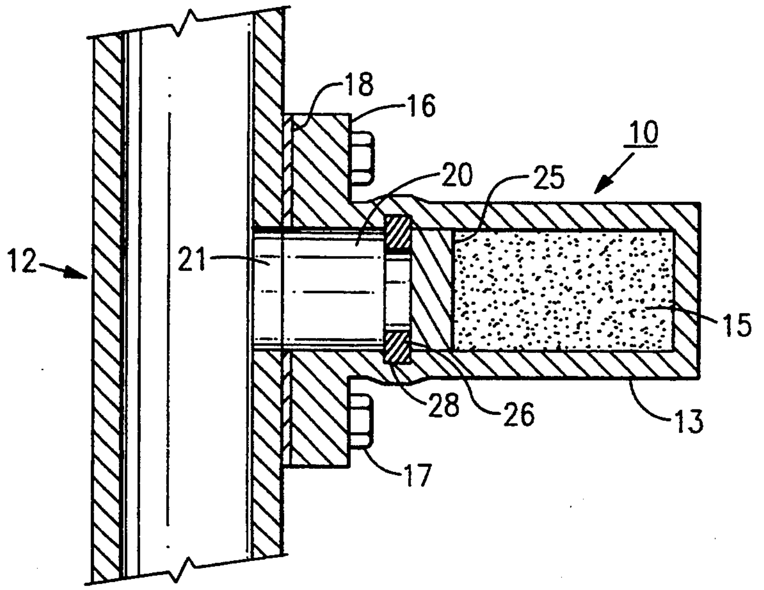
FIG. 1 is a side elevation, in section, showing a sorption pump embodying the teachings of the present invention.
Figure 2:
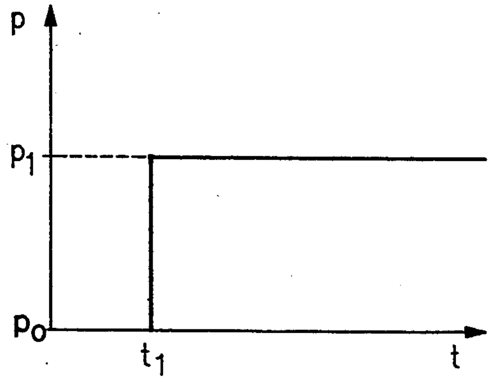
FIGS. 2–6 are diagrammatic representations showing various parameters of the present sorption pump with respect to time.

Referring initially to FIG. 1, there is shown a sorption pump, generally referenced 10, which embodies the teachings of the present invention. As noted above, the pump is ideally suited for use in association with a gas analyzing system to maintain the system at some vacuum pressure. The pump is designed to maintain a high vacuum in an associated pressure vessel 12 over a relatively long period of time. Initially, the pressure vessel is evacuated using a more conventional high vacuum pump and the sorption pump is used to maintain the vessel at or near the desired operating pressure.

The sorption pump includes an enclosed housing 13 that contains a quantity of getter material 15. Preferably, the getter material is selected from any one of many known non-evaporable getter materials depending upon the specific application. The material can be embedded in a substrate or can be in the form of pellets or loose granular particles with the later being preferred because of its ability to expose a maximum amount of surface area to gas samples being analyzed.

The housing is provided with a radially expanded flange 16 by which it can be attached to the pressure vessel by means of threaded fasteners 17 or the like. A gasket 18 is placed between the flange and vessel to provide a gas-tight joint. The housing has an inlet entrance 20 that is aligned with an opening 21 in the vessel thus furnishing a passage through which gas molecules in the vessel pass into the pump. A diffusion barrier 25 is mounted within the entrance of the housing and is held in place by means of a snap ring 26 that is supported in groove 28, formed in the wall of the housing. The area behind the frit is packed with the previously mentioned particulate non-evaporating getter material so that the diffusion barrier effects a delayed transport of incoming gas molecules to the sorptive material.

The barrier preferably is a porous disc that can be fabricated of glass, plastic, ceramics, or metal. The disc is made in the form of a frit of the type generally used in filtration applications. Depending on the type of gas molecules being pumped and the diffusion material employed, a finite period of time is required for the gas to pass through the diffusion barrier before it can be captured by the getter material. A gas analyzer such as a mass spectrometer operating in a pressure chamber serviced by the present sorption pump can accurately analyze sample pulses delivered by a gas chromatography unit or the like during the time period it takes the gas molecules to pass the barrier. As will be explained in greater detail below, the sorption pump is able to deliver a constant pumping speed during the delay period, thus enabling the mass spectrometer to make a precise evaluation of the gas sample.

Figure 3:
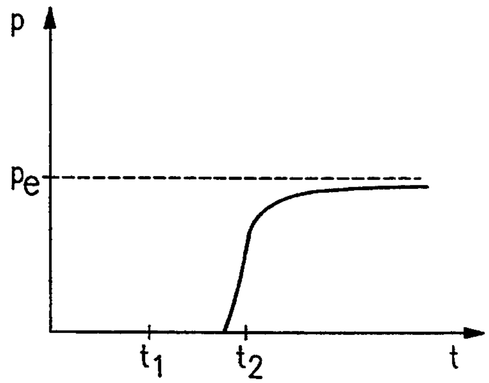

The operation of the sorption pump will now be explained in further detail with reference to the curves depicted in FIGS. 2–6 and the assumption that the pump maintain a vacuum chamber containing a mass spectrometer at some desired operating vacuum pressure. It will be further assumed that a carrier gas will be periodically transporting a sample pulse into the chamber for analysis. In the absence of a pulse sample, the pressure in the pump, that is, the pressure behind the diffusion barrier, and the pressure at the inlet to the pump are equal. This is represented at $p_0$ in FIG. 2. At some time, depicted as $t_1$, a pulse sample is introduced into the chamber and the pressure at the inlet will increase to some higher pressure $p_1$. This is shown as a step function in FIG. 2. FIG. 3 depicts the development of pressure inside the pump housing behind the diffusion barrier. During the diffusion period, the housing pressure will remain at the initial pressure level $p_0$. However, at time $t_1$ the gas molecules have crossed the barrier and the pressure in the housing rapidly rises and asymptotically approaches some equilibrium value $p_e$. The equilibrium value is slightly lower than the initial inlet pressure depending, among other things, on the barrier material, the getter material, and the sorption speed of the material.

Figure 4:
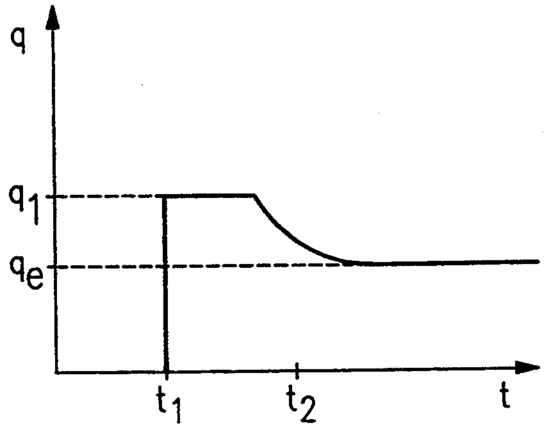
Figure 5:
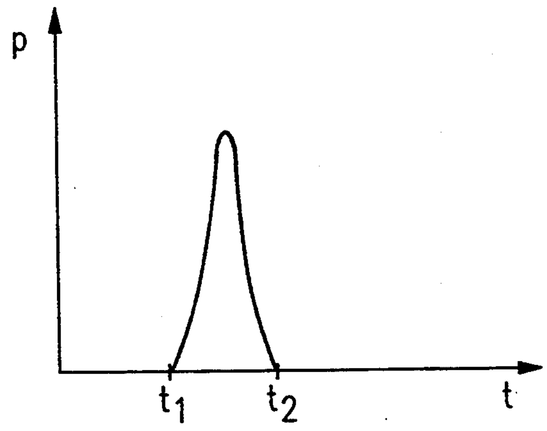
Figure 6:
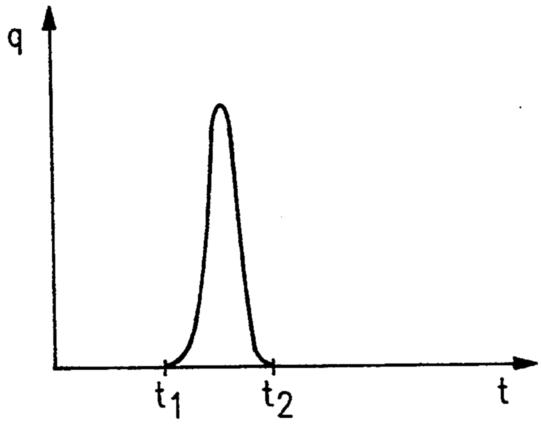

Gas flow through the inlet region of the pump is shown plotted against time in FIG. 4. Between the times $t_1$, and $t_2$, the pressure gradient over the diffusion system is at a maximum value and the gas flow $q_i$ is at a constant maximum value,. As the gas molecules are captured by the getter materials, the pressure within the pump housing behind the barrier increases and the flow through the inlet decreases to some lesser equilibrium value $q_e$. As can be seen, the equilibrium value is dependent upon the sorption speed of the getter material which has no influence on the initial flow $q_i$. The pumping speed of the pump between times $t_1$ and $t_2$ is, therefore, constant and thus provides a window during which time accurate measurements of the partial pressure of the gas can be made within the vacuum chamber. Typically, the pressure at the housing inlet will not follow a step function, but rather an impulse function between times $t_1$ and $t_2$ as shown in FIG. 5. The gas flow into the housing over the diffusion barrier will thus also follow the pressure curve during this period as depicted in FIG. 6.

The use of a diffusion barrier in the pump provides a window during which time the pumping speed of the system is both constant and smooth. This allows for accurate and repeatable analyzing of sample pulses by a mass spectrometer or the like.

While this invention has been explained with reference to the structure disclosed herein, it is not confined to the details set forth and this invention is intended to cover any modifications and changes as may come within the scope of the following claims:

What is claimed is:

1. A sorption pump for use in high vacuum applications, comprising:
- a vessel having an operating vacuum maintained therein, containing a quantity of gas molecules, and said vessel having an opening;
- an enclosed pump housing containing a quantity of sorption material, said housing having an inlet;
- connecting means for attaching said housing to said opening of said vessel in gaseous communication therewith through said inlet; and
- diffusion means disposed in said inlet for diffusion of said gas molecules therethrough during a finite period of time; whereby said gas molecules pass through the inlet and come into contact with said sorption material for capture thereby.

2. The sorption pump of claim 1 wherein said diffusion means is a frit made of a material selected from a group of materials consisting of ceramics, glass, plastic or metal.

3. The sorption pump of claim 1 wherein said sorption material is a non-evaporating getter material.

4. The sorption pump of claim 3 wherein the getter material is a finely ground particulate.

5. The sorption pump of claim 4 wherein the frit contains the getter material within the housing.

6. The sorption pump of claim 5 that further includes a retaining means for supporting the frit within the inlet of said housing.

7. The sorption pump of claim 1 wherein the sorption material is in the form of compressed pellets.

8. The sorption pump of claim 1 wherein the connecting means is a removable mounting flange for connecting the housing to said vessel whereby the housing can be quickly replaced after the sorption material is exhausted.

* * * * *